United States Patent
Rittmann et al.

(10) Patent No.: US 9,279,454 B2
(45) Date of Patent: Mar. 8, 2016

(54) SLIDE BEARING

(75) Inventors: Stefan Rittmann, Kirchheimbolanden (DE); Steven Doyle, Blacksburg, VA (US); Mateusz Michalski, Wiesbaden (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 0 days.

(21) Appl. No.: 14/404,857

(22) PCT Filed: May 31, 2012

(86) PCT No.: PCT/EP2012/060250
§ 371 (c)(1),
(2), (4) Date: Apr. 20, 2015

(87) PCT Pub. No.: WO2013/178266
PCT Pub. Date: Dec. 5, 2013

(65) Prior Publication Data
US 2015/0226261 A1    Aug. 13, 2015

(51) Int. Cl.
*F16C 33/20* (2006.01)
*F16C 9/02* (2006.01)

(52) U.S. Cl.
CPC .................. *F16C 33/206* (2013.01); *F16C 9/02* (2013.01); *F16C 33/203* (2013.01); *Y02T 10/865* (2013.01)

(58) Field of Classification Search
CPC .... F16C 17/022; F16C 33/122; F16C 33/124; F16C 33/125; F16C 33/127; F16C 33/20; F16C 33/203; F16C 33/205; F16C 33/206; F16C 33/208
See application file for complete search history.

(56) References Cited

U.S. PATENT DOCUMENTS

| | | | | |
|---|---|---|---|---|
| 3,361,502 | A * | 1/1968 | Weinkamer | F16C 17/10 384/294 |
| 4,896,368 | A * | 1/1990 | Just | F16C 33/12 384/276 |
| 6,089,755 | A * | 7/2000 | Okamoto | F16C 9/02 384/276 |
| 6,120,187 | A * | 9/2000 | Ono | F16C 9/04 384/273 |
| 8,545,102 | B2 * | 10/2013 | Hayashi | F16C 17/02 298/898.048 |
| 2009/0003740 | A1 | 1/2009 | Schubert et al. | |
| 2014/0177989 | A1* | 6/2014 | Rossmanith | F16C 17/022 384/276 |

FOREIGN PATENT DOCUMENTS

| | | |
|---|---|---|
| DE | 3719789 A1 | 12/1988 |
| GB | 732 249 A | 6/1955 |
| WO | WO 2009/059344 A2 | 5/2009 |

* cited by examiner

*Primary Examiner* — Thomas R. Hannon
(74) *Attorney, Agent, or Firm* — Robert L. Stearns; Dickinson Wright, PLLC

(57) ABSTRACT

A slide bearing has a layered structure which is substantially uniform over the circumference thereof and comprises a base (10), a lead-free slide layer (12) having a thickness which is reduced in edge zones (16) as compared to a central zone between the edge zones (16), and a polymer coating (14) which is thicker in the edge zones (16) as compared to the central zone, so that the surface level of the coating (14) is substantially flat as seen in axial cross-section.

3 Claims, 1 Drawing Sheet

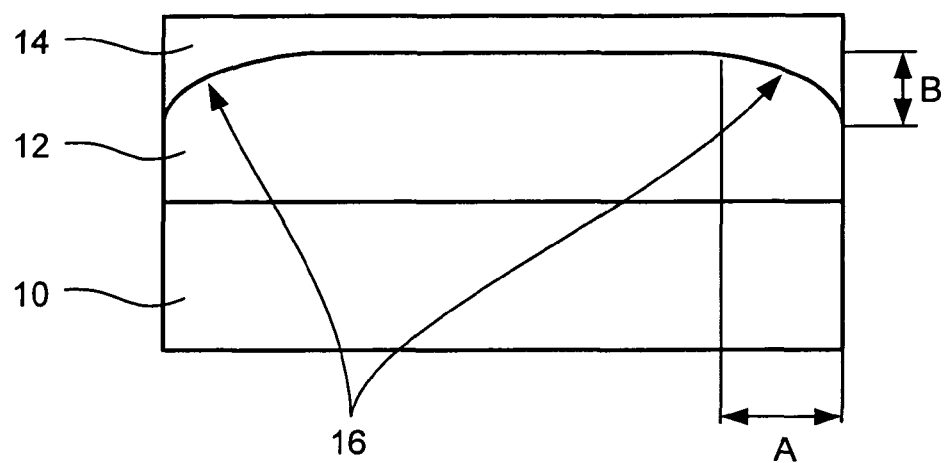

SLIDE BEARING

BACKGROUND OF THE INVENTION

1. Technical Field

The invention relates to a slide bearing.

2. Related Art

Slide bearings are used in many technical fields and are frequently subject to heavy loads. This, for example, applies to bearings supporting the crankshaft of an engine which can be loaded to an extent which causes deformation of the crankshaft. This can lead to a breakage in the oil film between the bearing and the shaft, particularly towards the (axial) edges of the bearing. This can lead to excessive wear and seizure. Further consequences are fatigue damages.

WO 2009/059344 A2 is related to a bearing having various running layers along the circumference thereof.

DE 37 19 789 A1 describes a slide bearing having a carrier layer, an intermediate layer containing lead and a slide layer also containing lead. A hard support layer can be present below the slide layer.

SUMMARY OF THE INVENTION

It is an object to provide a slide bearing with improved war characteristics.

Accordingly, the slide bearing has a layered structure, which is substantially uniform over the circumference thereof. In other words, the bearing does not require any partial layers which may be present along the circumference in some parts and may be absent in other parts. Rather, wherever an axial cross-section, i.e. a section containing the axis of the slide bearing, is taken anywhere along the circumference, a more or less identical layer structure can be observed. Since the slide bearings are typically provided as two halves, i.e. two half cylinders, the same can be observed at one such half along the circumference in this case covering 180 degrees.

The layered structured of the novel slide bearing comprises a base, preferably made of steel, a lead-free slide layer provided on the base and a polymer coating on top of the slide layer which is the outermost layer and adapted to be in contact with the shaft to be supported, preferably with an oil film inbetween. The slide layer has a thickness which is reduced in edge zones, as seen in an axial cross-section, as compared to a central zone between the edge zones. In other words, the shape of the slide layer can be called convex, with a preferably flat central zone and convexly curved edge zones. The reduced thickness in the end zones potentially prevents wear and edge seizure, even when the supported shaft is deformed.

In the novel slide bearing, the polymer coating is thicker in the edge zones as compared to the central zone so that, as seen in an axial cross-section, the surface level of the coating is substantially flat in axial direction. Nevertheless, the thickness of the polymer coating can, also in the central zone, vary in a range of 5 to 11 µm. In other words, the increased thickness of the polymer coating compensates the reduced thickness of the slide layer in the edge zones. This creates a kind of reservoir of coating material in the edge zones, which is particularly useful for initial wear during a phase, in which the bearing and the shaft get "adjusted to each other". This advantageously increases the resistance to edge seizure and leads to an improved alignment of the shaft, such as a crankshaft, relative to the bearing.

It is noted that a lead-free slide layer can also be coated with a different material than a polymer, and a polymer coating having a thickness as described above can also be provided on a slide layer containing lead, and the aforementioned feature combinations are considered subject-matter of the present application. For example, the coating can also be a PVD-, a galvanized or a similar layer.

In order to provide superior load bearing capacity, the slide layer is substantially flat, as seen in an axial cross-section, in the central zone.

As regards the dimensions of the edge zones, first experiments have shown that edge zones, i.e. zones in which the thickness of the slide layer is decreased, having a width of 3 to 4 mm each lead to advantageous behavior of the slide bearing.

As regards the preferred convexity, i.e. the reduction in thickness of the slide layer in the end zones, a decrease of thickness in the order of 3 to 6 µm has proven efficient.

BRIEF DESCRIPTION OF THE DRAWINGS

Hereinafter, the invention will be explained further with reference to a preferred embodiment shown in the drawing, which is an axial cross-section of the novel slide bearing.

DETAILED DESCRIPTION OF THE PREFERRED EMBODIMENTS

As can be seen in the FIGURE, the novel slide bearing has three layers, i.e. a base 10, typically made of steel, a slide layer 12 of an appropriate lead-free alloy, and a coating 14. In the orientation of the FIGURE, the axis (not shown) of a shaft to be supported (not shown) would be oriented in the left-right direction. Further, the coating 14 is adapted to contact the shaft to be supported with an oil film inbetween.

As can be seen in the FIGURE, the slide layer 12 is substantially flat in a central zone which constitutes approximately 60% of the total width of the bearing. The thickness of the slide layer 12 is decreased in edge zones 16. The edge zones 16 each have a width A of approximately 3 to 4 mm, and the thickness of the slide layer is decreased in these edge zones 16 by an amount B of approximately 3 to 6 µm. As can be taken from the drawing, the slide layer is formed so as to be convexly curved in the edge zones 16, as can be seen in the axial cross-section of the FIGURE and can be described to be convex as a whole.

In order to "compensate" the reduced thickness of the slide layer 12 in the edge zones 16, the thickness of the coating 14 is increased in these zones so as to provide a coating, the surface of which is substantially flat over the entire width of the bearing including the edge zones 16, as seen in the axial cross-section.

The invention claimed is:

1. Slide bearing having a layered structure which is substantially uniform over the circumference thereof, comprising a base, a lead-free slide layer having a thickness which is reduced in edge zones as compared to a central zone between the edge zones, and a polymer coating which is thicker in the edge zones as compared to the central zone, so that the surface level of the coating is substantially flat as seen in the axial cross-section; and the central zone is substantially flat as seen in the axial cross-section.

2. Slide bearing in accordance with claim 1, wherein each edge zone has a width of approximately 3 to 4 mm.

3. Slide bearing in accordance with claim 1, wherein the thickness of the slide layer is reduced by approximately 3 to 6 µm in the edge zones.

* * * * *